US006975889B2

(12) United States Patent
Chen et al.

(10) Patent No.: US 6,975,889 B2
(45) Date of Patent: Dec. 13, 2005

(54) COVER-EJECTING MECHANISM FOR A COMMUNICATION UNIT

(75) Inventors: Chun-Lung Chen, Taipei (TW); Hsiang-Lung Kao, Taipei (TW); Kok-Kan Chan, Shijr (TW)

(73) Assignee: Quanta Computer Inc., (TW)

( * ) Notice: Subject to any disclaimer, the term of this patent is extended or adjusted under 35 U.S.C. 154(b) by 573 days.

(21) Appl. No.: 10/161,140

(22) Filed: May 30, 2002

(65) Prior Publication Data

US 2004/0204001 A1    Oct. 14, 2004

(51) Int. Cl.⁷ .............................................. H04M 1/00
(52) U.S. Cl. ............... 455/575.1; 455/90.3; 455/575.8; 455/575.1
(58) Field of Search .................... 455/550.1, 575.1, 455/575.4, 575.8, 90.3; 379/433.12

(56) References Cited

U.S. PATENT DOCUMENTS

| 6,151,485 | A * | 11/2000 | Crisp ...................... 455/575.4 |
| 6,370,362 | B1 * | 4/2002 | Hansen et al. ............. 455/90.1 |
| 6,463,262 | B1 * | 10/2002 | Johnson et al. ............ 455/90.1 |
| 6,782,242 | B1 * | 8/2004 | Koleda et al. ............. 455/90.3 |
| 6,842,626 | B1 * | 1/2005 | Kubo et al. .............. 455/550.1 |
| 2001/0019946 | A1 * | 9/2001 | Okuda ......................... 455/90 |
| 2002/0142807 | A1 * | 10/2002 | Cho ........................... 455/564 |
| 2003/0068035 | A1 * | 4/2003 | Pirila et al. ................. 379/447 |

* cited by examiner

Primary Examiner—Temica Beamer
Assistant Examiner—Julio Perez
(74) Attorney, Agent, or Firm—Merchant & Gould P.C.

(57) ABSTRACT

A cover-ejecting mechanism for a communication unit. The ejecting mechanism comprises a push portion, a guide portion and a cover portion. The push portion is disposed on a housing of the communication unit in a movable manner. The guide portion, having a slide track and a moving portion moving along the slide track, is disposed on the housing. The moving portion abuts the push portion. The cover portion, having a slide frame attached to the moving portion, is disposed on the housing in a moveable manner. When the moving portion abuts the push portion, the cover portion covers an input device of the communication unit. When the moving portion does not abut the push portion, the cover portion does not cover the input device.

11 Claims, 10 Drawing Sheets

COVER-EJECTING MECHANISM FOR A COMMUNICATION UNIT

BACKGROUND OF THE INVENTION

1. Field of the Invention

The invention relates to a cover-ejecting mechanism for a communication unit; in particular, to a modular ejecting mechanism that can automatically eject the cover of the communication unit.

2. Description of the Related Art

Mobile communication units are now very popular among the general consumers to provide convenient communications, such mobile phones and personal digital assistance (PDA). In mobile phones, a slide cover or a pivotal-flip cover is used to prevent a key panel from damage by environment.

FIG. 1, FIG. 2a, and FIG. 2b are drawings of a conventional mobile phone 10 with a slide cover. Referring to FIG. 1, a front cover 1 is provided with two slide tracks 2. A slide cover 3 is provided with two slide frames 4, and it is moveably disposed on the front cover 1 by the slide tracks 2 and the slide frames 4. A key panel 5 is disposed on the front cover 1, and a slide release mechanism 6 is disposed inside the mobile phone 10.

Referring to FIG. 2a and FIG. 2b, the slide release mechanism 6 is provided with a spring 7, a push button 8 and an arm 9. When the push button 8 is pushed at the bottom of the mobile phone 10, the arm 9 is disengaged so as to release the spring 7. Thus, the slide frames 4 can slide outwardly from the slide tracks 2, and the slide cover 3 can slide freely relative to the front cover 1.

The conventional mobile phone 10 has following disadvantages:

1. Since the front cover 1 is provided with two slide tracks 2 at both sides, the slide cover 3 is required to be provided with two slide frames 4 at both sides. As a result, both assembly time and cost increase.

2. Since the push button 8 is located at the bottom of the mobile phone 10, it is very inconvenient in use. In addition, the slide cover 3 may accidentally disengage with the front cover 1.

3. Since each part of the slide release mechanism 6 is not modular, its assembly is cumbersome.

FIG. 3 shows another conventional mobile phone 20 with a slide cover. The mobile phone 20 is provided with a body 11 and a slide cover 12. The disadvantage of this mobile phone 20 is that the slide cover 12 can only be pulled out from the body in a manual manner. That is, there is no push button, as shown in FIG. 2a, to automatically eject the slide cover 12.

SUMMARY OF THE INVENTION

In order to address the disadvantages of the aforementioned communication unit, the invention provides a modular ejecting mechanism that can automatically eject the cover of the communication unit.

Accordingly, the invention provides a cover-ejecting mechanism for a communication unit provided with a housing and an input device. The ejecting mechanism comprises a push portion, a guide portion and a cover portion. The push portion is disposed on the housing in a movable manner. The guide portion, having a slide track and a moving portion moving along the slide track, is disposed on the housing. The moving portion moves between a first position and a second position, and the moving portion abuts the push portion when the moving portion locates at the first position. The cover portion, having a slide frame attached to the moving portion, is disposed on the housing in a moveable manner. The cover portion covers the input device when the moving portion locates at the first position, and the cover portion does not cover the input device and does not abut the push portion when the moving portion locates at the second position.

In a preferred embodiment, the guide portion further comprises a fixing member and a first spring. The fixing member is provided with the slide track thereon, and the first spring connects the fixing member and the moving portion.

Furthermore, the moving portion comprises a moving member and an engaging member. The moving member, connecting the first spring, is disposed on the slide track in a moveable manner. The engaging member, disposed on the moving member, engages with the slide frame. The engaging member engages with the fixing member in a detachable manner.

Furthermore, the push portion comprises a button and a second spring. The button, disposed on the housing, engages with the engaging member in a detachable manner. The second spring connects the button and the housing.

Furthermore, the cover portion is provided with a first cover, a second cover, and a third cover, and the slide frame is formed on the first cover.

In another preferred embodiment, the invention provides a communication unit. The communication unit comprises a housing, an input device, a push portion, a guide portion and a cover portion. The input device is disposed on the housing, and the push portion is disposed on the housing in a movable manner. The guide portion, having a slide track and a moving portion moving along the slide track, is disposed on the housing. The moving portion moves between a first position and a second position, and the moveable member abuts the push portion when the moving portion locates at the first position. The cover portion, having a slide frame attached to the moving portion, is disposed on the housing in a moveable manner. The cover portion covers the input device when the moving portion locates at the first position, and the cover portion does not cover the input device and does not abut the push portion when the moving portion locates at the second position.

BRIEF DESCRIPTION OF THE DRAWINGS

The invention is hereinafter described in detail with reference to the accompanying drawings in which:

FIG. 2b is a perspective view depicting the slide release mechanism as shown in FIG. 2a;

FIG. 5a is an exploded view depicting a push portion and a guide portion as shown in FIG. 4a;

FIG. 5b is a perspective view depicting the button portion and the guide portion as shown in FIG. 5a;

FIG. 6a is an exploded view depicting the cover portion as shown in FIG. 4a;

FIG. 6b is a perspective view depicting the cover portion as shown in FIG. 6a;

DETAILED DESCRIPTION OF THE INVENTION

Figure 1:
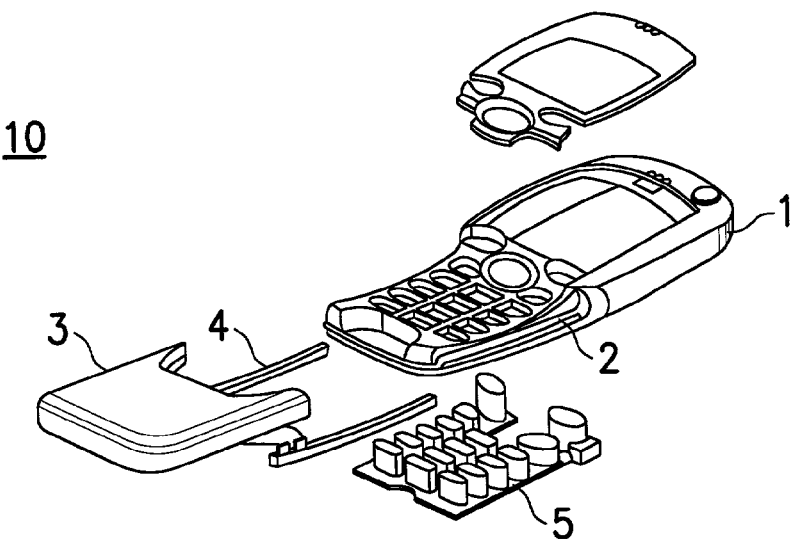
FIG. 1 is an exploded view depicting a conventional mobile phone.
Figure 1:
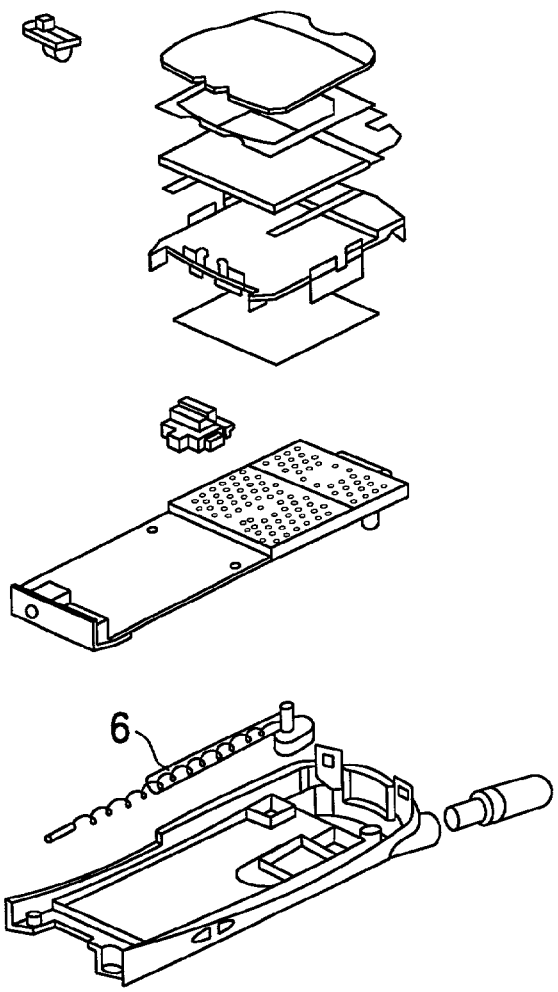
Figure 2A:
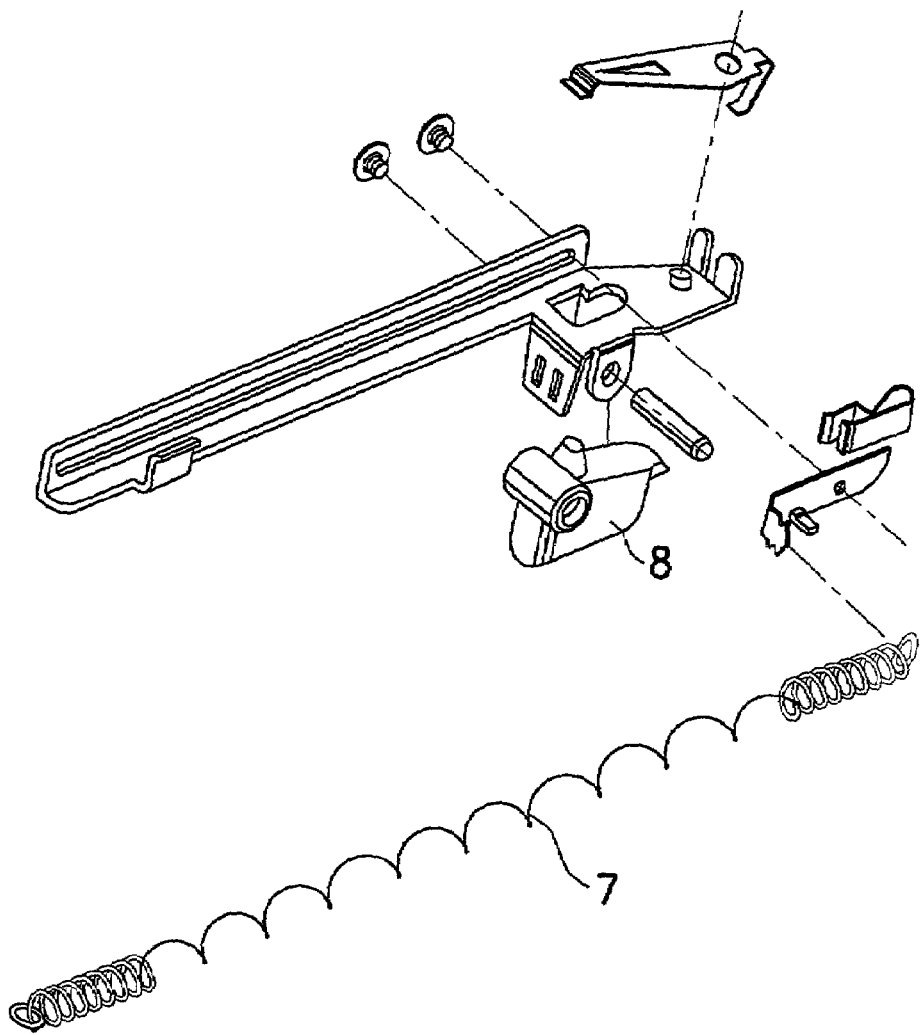
FIG. 2a is an exploded view depicting a slide release mechanism as shown in FIG. 1.
Figure 2B:
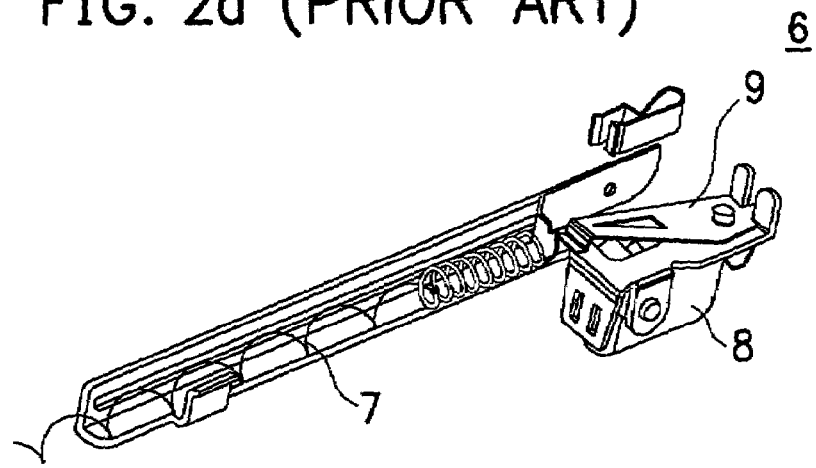
Figure 3:
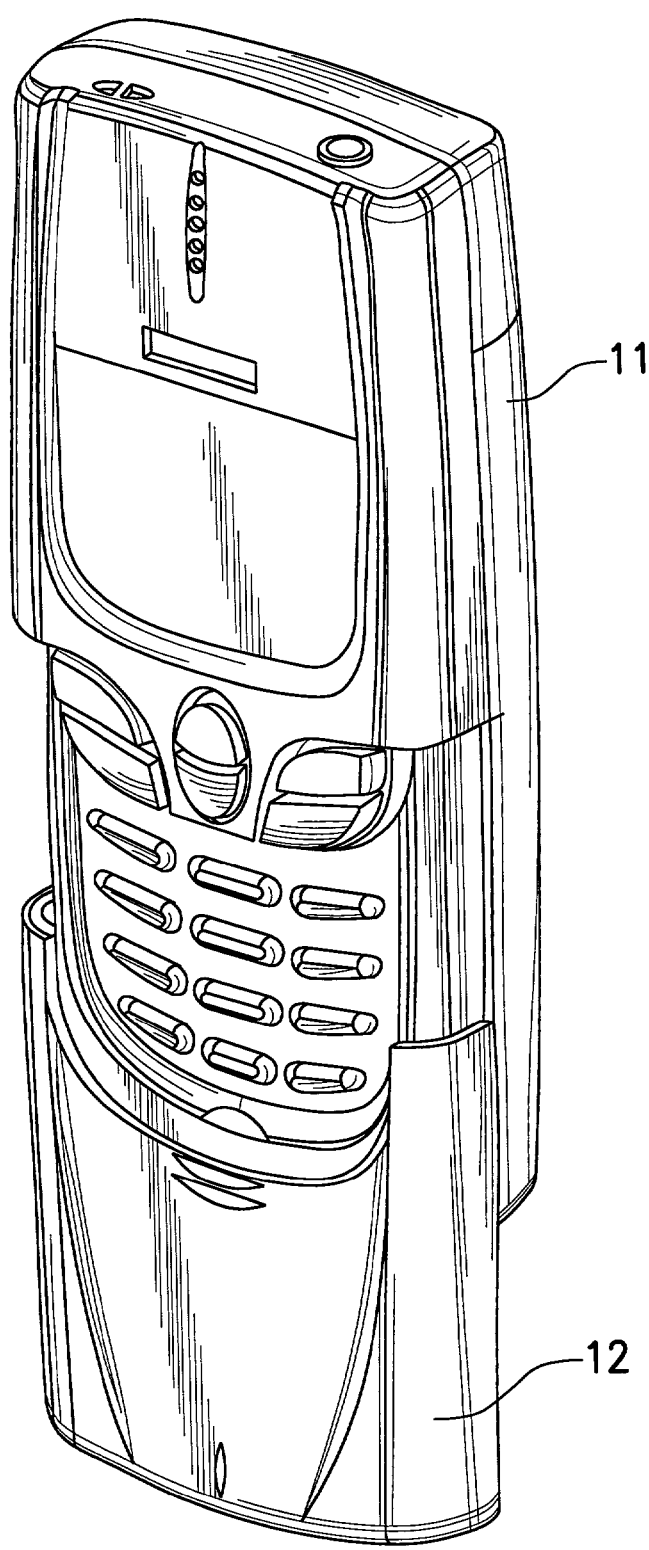
FIG. 3 is a perspective view depicting another conventional mobile phone.
Figure 4B:
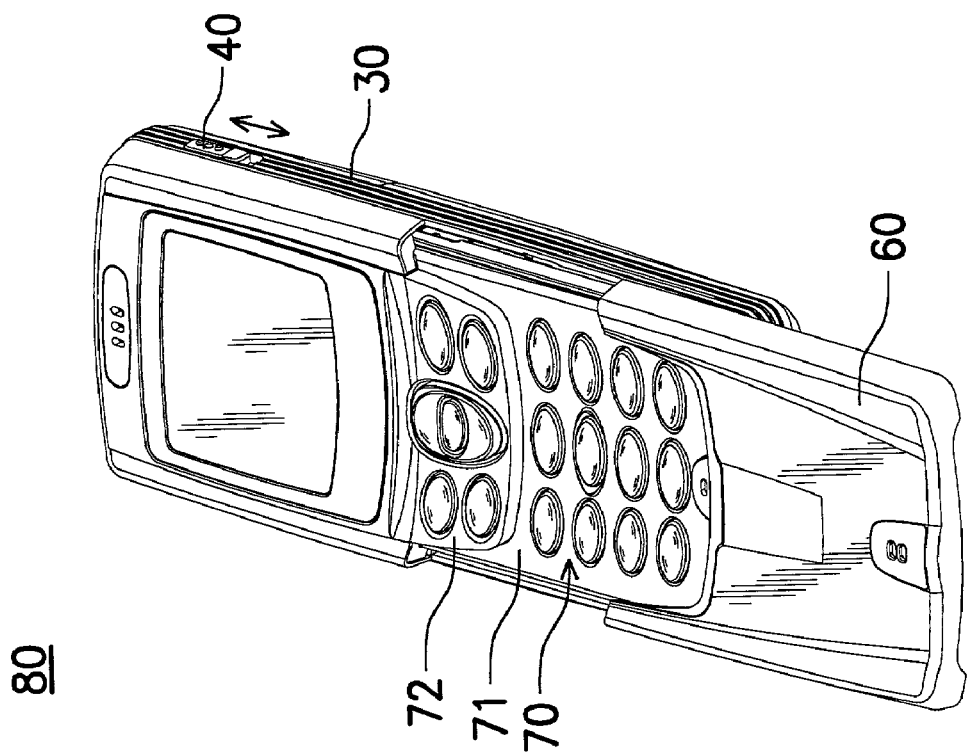
FIG. 4b is a schematic view depicting an ejecting mechanism as shown in FIG. 4a, wherein the cover portion does not cover the input device.
Figure 4A:
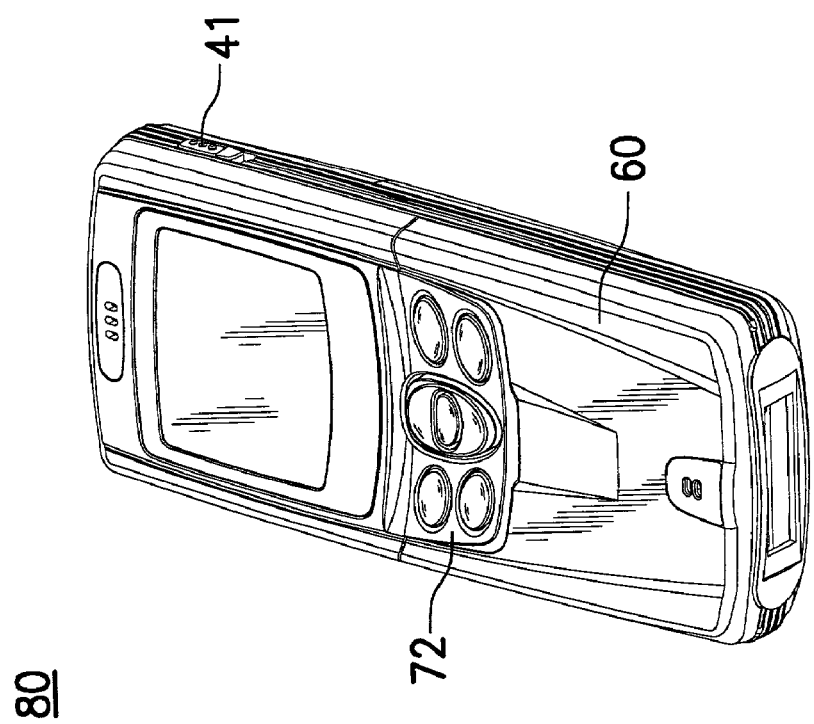
FIG. 4a is a schematic view depicting a cover-ejecting mechanism for a communication unit as disclosed in this invention, wherein a cover portion covers an input device.
Figure 5A:
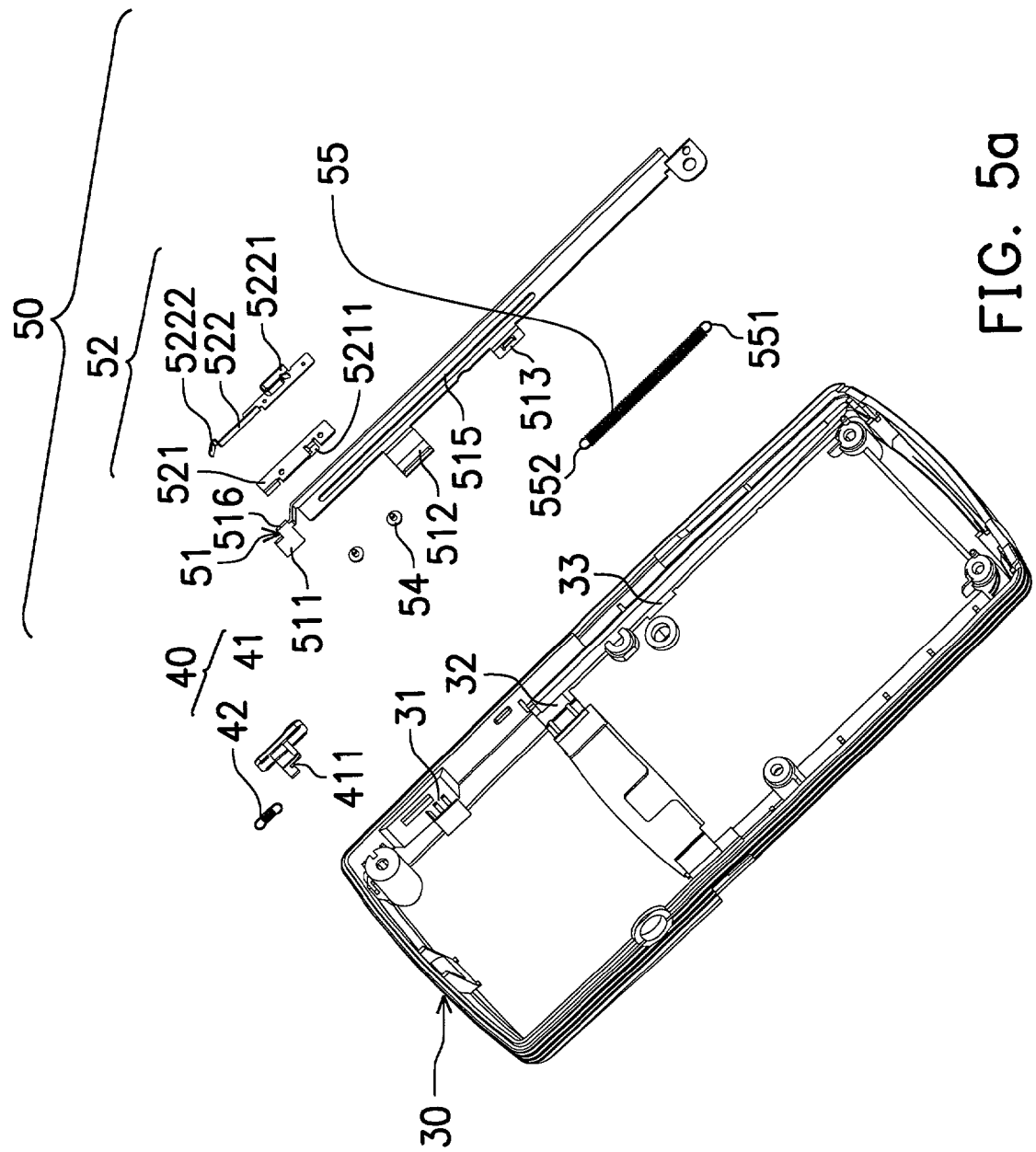

Referring to FIG. 4a, FIG. 4b, FIG. 5a, FIG. 5b, and FIG. 5c, a cover-ejecting mechanism as disclosed in this invention is adapted for a communication unit. In this embodiment, the communication unit is represented by a mobile phone 80. The mobile phone 80 is provided with a housing 30 and an input device 70. As shown in FIG. 5a, the housing 30 is used as a body of the mobile phone 80, and is provided with a first receiving portion 31, a second receiving portion 32, and a third receiving portion 33. As shown in FIG. 4b, the input device 70 is provided with a numeral portion 71 for inputting characters and a functional portion 72 for inputting special functions.

Figure 5B:
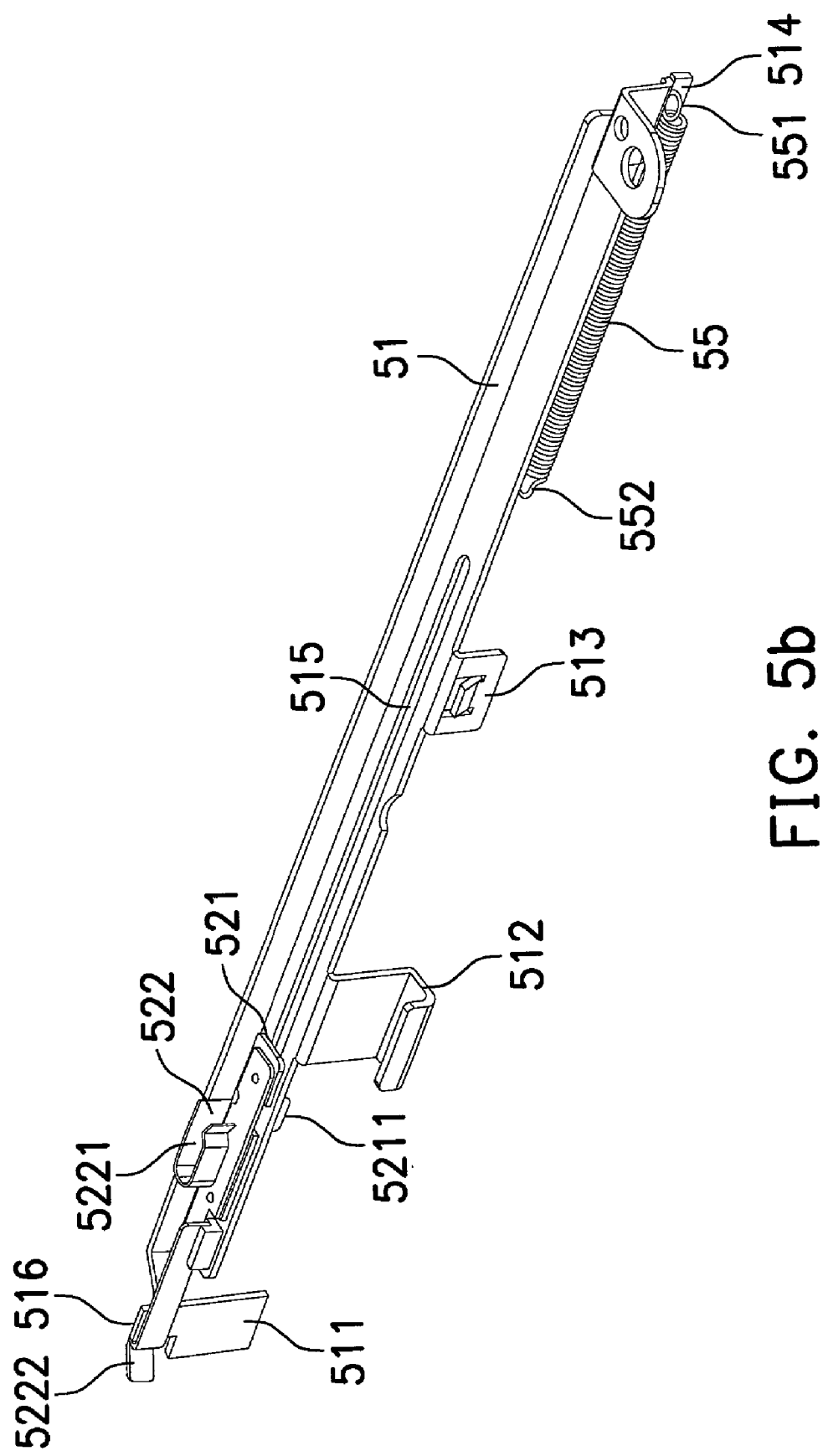
Figure 5C:
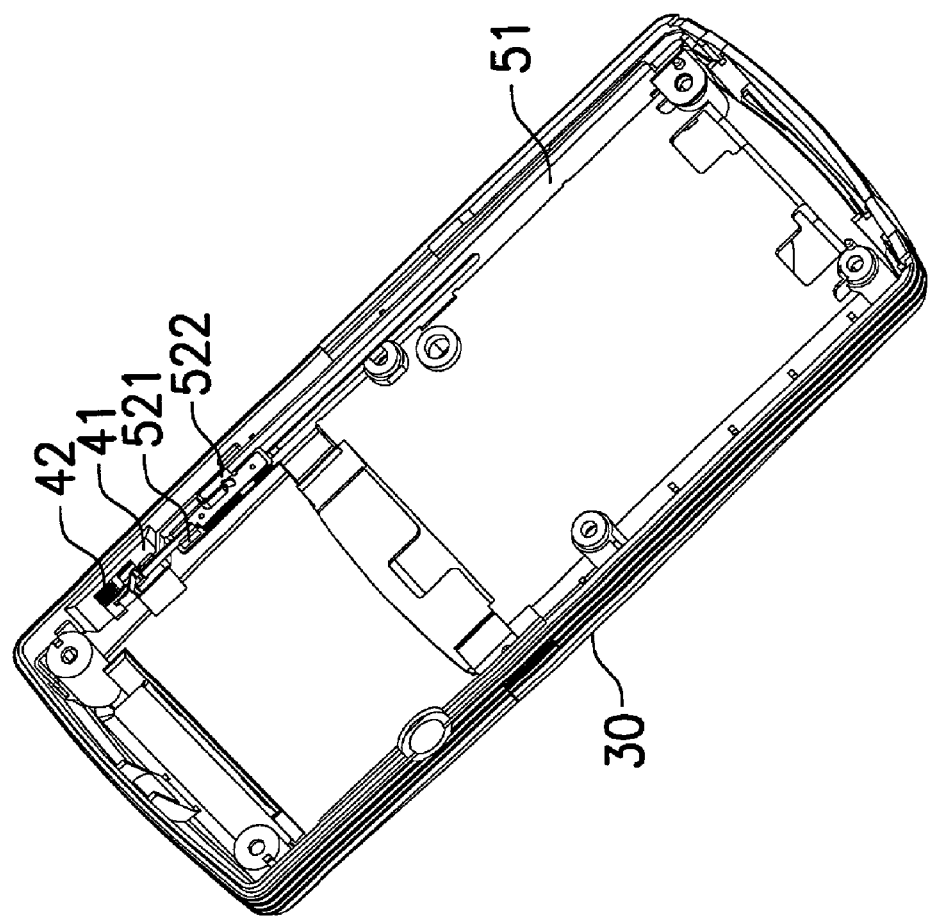
FIG. 5c is a schematic view depicting the button portion and the guide portion as shown in FIG. 5a, wherein the button portion and the guide portion are disposed on a housing.
Figure 6A:
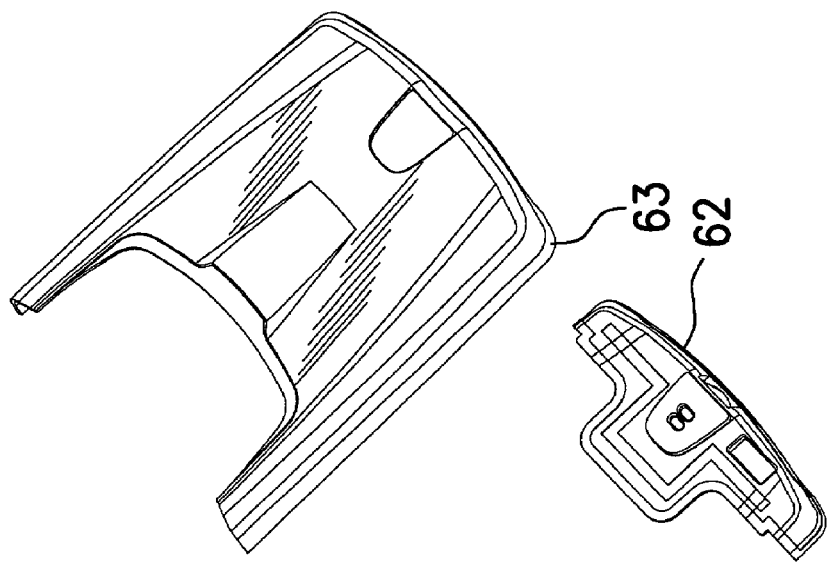
Figure 6A:
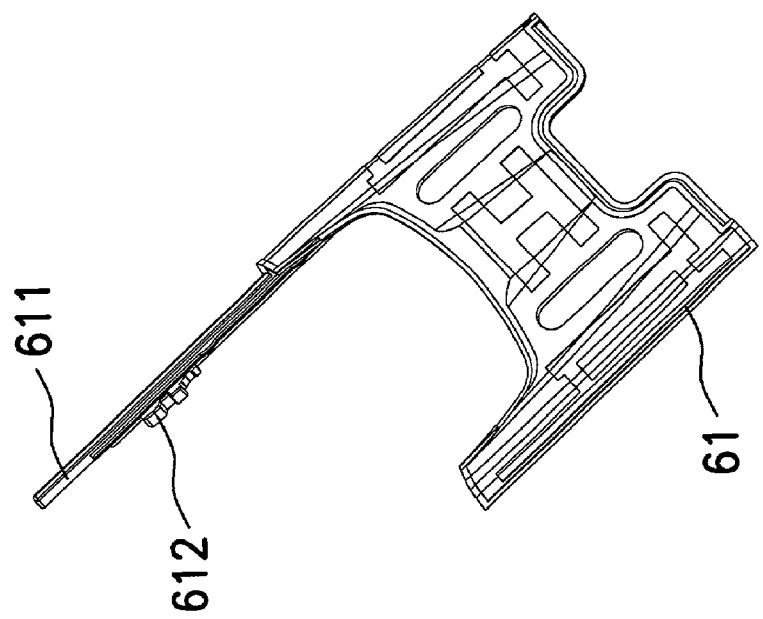
Figure 6B:
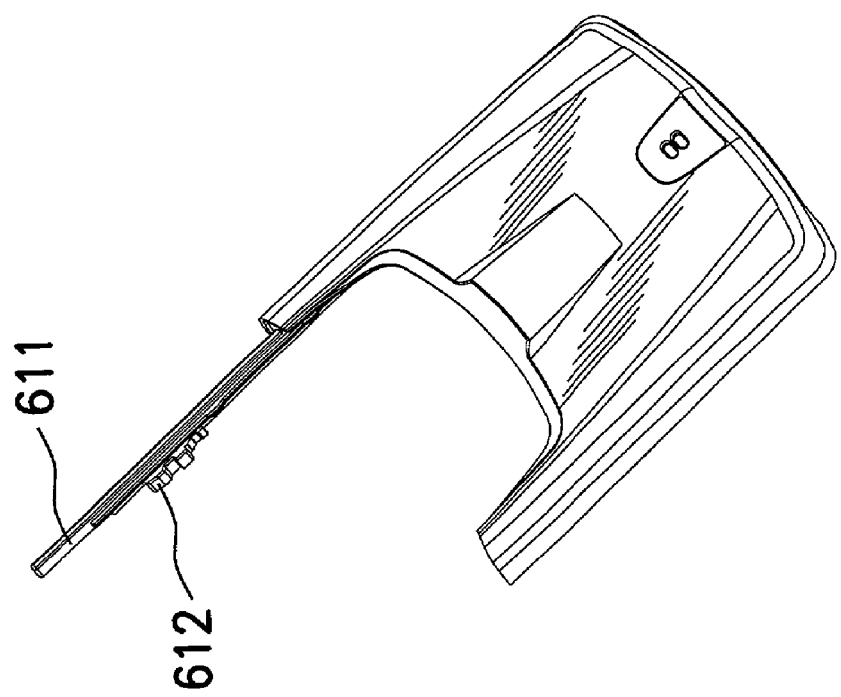

The ejecting mechanism as disclosed in this embodiment comprises a push portion 40, a guide portion 50 and a cover portion 60. As shown in FIG. 5a, FIG. 5b, and FIG. 5c, the guide portion 50 is disposed on the housing 30, and comprises a fixing member 51, a moving portion 52 and a first spring 55. The fixing member 51 is provided with a first engaging portion 511, a second engaging portion 512, a third engaging portion 513, a first notch 514, a slide track 515, and an abutting portion 516. The first engaging portion 511, the second engaging portion 512, and the third engaging portion 513 are received in the first receiving portion 31, the second receiving portion 32, and the third receiving portion 33 of the housing 30 respectively. Thus, the fixing member 51 is disposed on the housing 30.

The first spring 55 is provided with a first end 551 and a second end 552. The first end 551 connects with the second notch 514 of the fixing member 51, and the second end 552 connects with the moving portion 52.

The moving portion 52 is moveably disposed on the slide track 515 of the fixing member 51 by two rivets 54. The moving portion 52 comprises a moving member 521 and an engaging member 522. The moving member 521, having a second notch 5211, is disposed on the slide track 515 of the fixing member 51 in a moveable manner. The moving member 521 connects with the second end 552 of the first spring 55 by the second notch 5211. The engaging member 522 is disposed on the moving member 521, and engages with the fixing member 51 in a detachable manner. The moving member 52 is provided with a fourth receiving portion 5221 and a step portion 5222. The step portion 5222 abuts the abutting portion 516 of the fixing member 51.

Furthermore, referring to FIG. 5a, FIG. 5b, and FIG. 5c, the push portion 40 is disposed on the housing 30 in a movable manner. The push portion 40 comprises a button 41 and a second spring 42. The button 41, disposed on the housing 30 and provided with a third notch 411, engages with the engaging member 522 of the moving member 52 of the guide portion 50 in a detachable manner so as to disengage the fixing member 51 and the cover portion 60. The second spring 42 connects the third notch 411 of the button 41 and the housing 30 so as to keep the button 41 in a predetermined position.

Referring to FIG. 6a, FIG. 6b, FIG. 7a and FIG. 7b, the cover portion 60 is moveably disposed on the housing 30, and is provided with a first cover 61, a second cover 62, and a third cover 63. The first cover 61 is provided with a slide frame 611 engaging with the moving portion 52 of the guide portion 50. The slide frame 611 is provided with an abutting member 612, received in the fourth receiving portion 5221 of the engaging member 522, so that the first cover 61 moves along with the moving portion 52. The second cover 62 is used for a microphone, and the third cover 63 is used to beatify the whole appearance of the cover portion 60. The first cover 61, the second cover 62, and the third cover 63 can be combined into a model by adhesion.

Figure 7B:
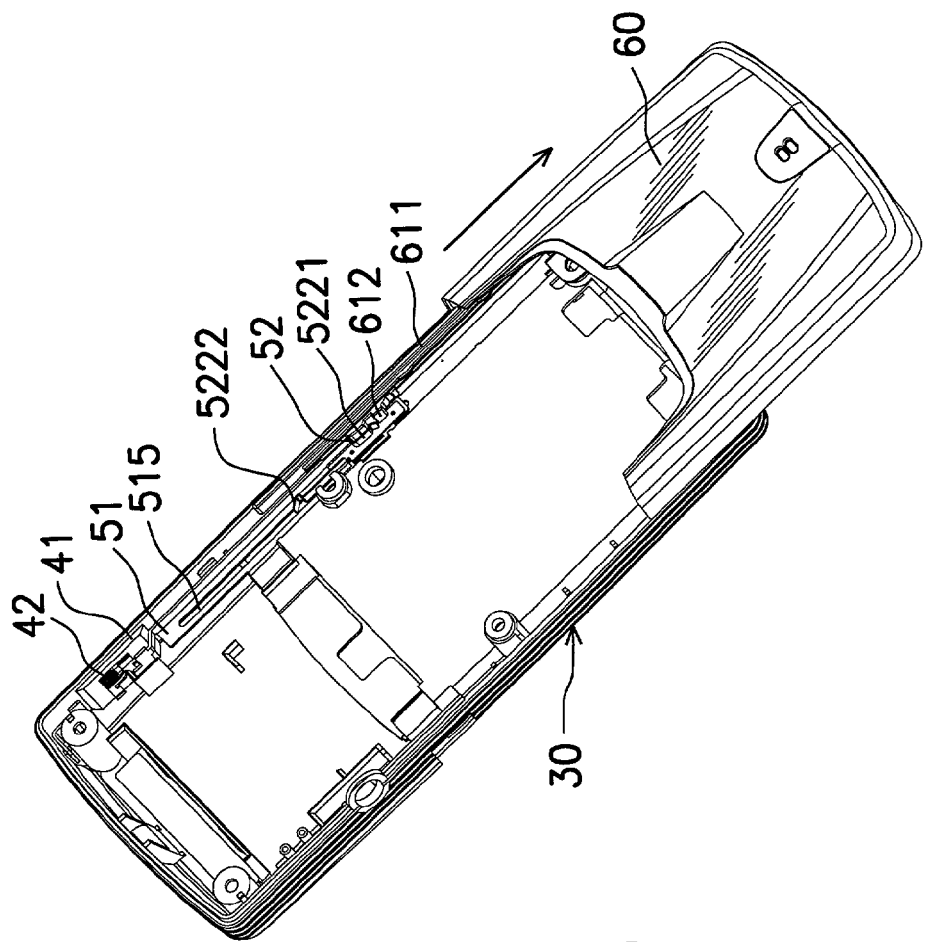
FIG. 7b is a schematic view depicting the cover portion as shown in FIG. 7a, wherein the cover portion is pulled out from the housing.
Figure 7A:
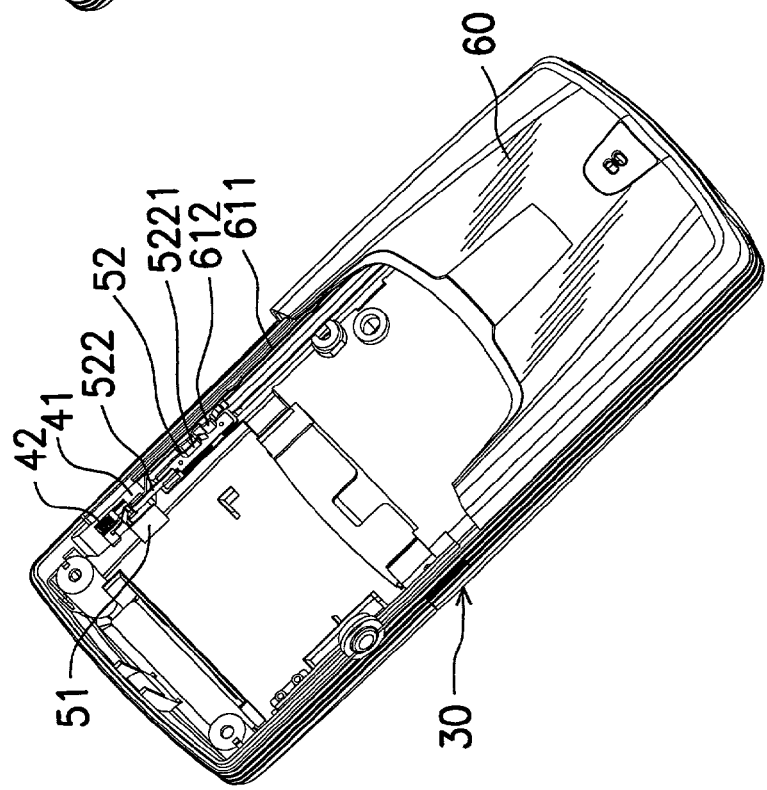
FIG. 7a is a schematic view depicting the cover portion as shown in FIG. 6a, wherein the cover portion is disposed on the housing.

Referring to FIG. 7a and FIG. 7b, the moving portion 52 moves between a first position as shown in FIG. 7a and a second position as shown in FIG. 7b. When the moving portion 52 locates at the first position, the moving portion 52 abuts the push portion 40 and the cover portion 60 covers the numeral portion 71 of the input device 70 as shown in FIG. 4a. When the moving portion 52 locates at the second position, the moving portion 52 does not abut the push portion 40 and the cover portion 60 does not cover the numeral portion 71 of the input device 70 as shown in FIG. 4b.

Specifically, when the ejecting mechanism is not activated, the cover portion 60 locates at the first position as shown in FIG. 4a. At the same time, the step portion 5222 of the engaging member 522 abuts the button 41 and the abutting portion 516 of the fixing member 51, and the first spring 55 is extended.

When the ejecting mechanism is activated, the cover portion 60 locates at the second position as shown in FIG. 4b. At the same time, the button 41 is pushed downward so as to press and bend the step portion 5222. Thus, the step portion 5222 disengages with the butting portion 516 so that the moving portion 52 moves freely. As a result, the slide frame 611 of the first cover 61 of the cover portion 60 moves along with the moving portion 52 while the first spring 55 is not extended.

As stated above, the cover portion of the communication unit can be automatically ejected by the ejecting mechanism with a simplified and modular structure. Thus, it is very convenient for mass production.

Specifically, since both of the slide track 515 and the slide frame 611 are only formed at one side of the fixing member 51 and the first cover 61 respectively, the whole assembly of the communication unit can be simplified and the cost is also lowered.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A cover-ejecting mechanism for a communication unit, provided with a housing and an input device, comprises:

a push portion disposed on the housing in a movable manner;

a guide portion, having a slide track and a moving portion moving along the slide track, disposed on the housing, wherein the moving portion comprises a moving member, disposed on the slide track in a moveable manner, and the moving portion moves between a first position and a second position, and the moving portion abuts the push portion when the moving portion locates at the first position; and a cover portion, having a slide frame attached to the moving portion, disposed on the housing in a moveable manner, wherein the moving portion further comprises an engaging member, disposed on the moving member, engaging with the slide frame, and the cover portion covers the input device when the moving portion locates at the first position, and the cover portion does not cover the input device and does not abut the push portion when the moving portion locates at the second position.

2. The ejecting mechanism as claimed in claim 1, wherein the guide portion further comprises: a fixing member provided with the slide track thereon; and a first spring connecting the fixing member and the moving portion.

3. The ejecting mechanism as claimed in claim 2, wherein the a moving member, connects the first spring, and the engaging member engages with the fixing member in a detachable manner.

4. The ejecting mechanism as claimed in claim 3, wherein the push portion comprises: a button, disposed on the housing, engaging with the engaging member in a detachable manner; and a second spring connecting the button and the housing.

5. The ejecting mechanism as claimed in claim 1, wherein the cover portion is provided with a first cover, a second cover, and a third cover, and the slide frame is formed on the first cover.

6. A communication unit comprises:

a housing;

an input device disposed on the housing, a push portion disposed on the housing in a movable manner;

a guide portion, having a slide track and a moving portion moving along the slide track, disposed on the housing, wherein the moving portion comprises a moving member, disposed on the slide track in a moveable manner, and the moving portion moves between a first position and a second position, and the moving portion abuts the push portion when the moving portion locates at the first position; and a cover portion, having a slide frame attached to the moving portion, disposed on the housing in a moveable manner, wherein the moving portion further comprises an engaging member, disposed on the moving member, engaging with the slide frame, and the cover portion covers the input device when the moving portion locates at the first position, and the cover portion does not cover the input device and does not abut the push portion when the moving portion locates at the second position.

7. The communication unit as claimed in claim 6, wherein the guide portion further comprises: a fixing member provided with the slide track thereon; and a first spring connecting the fixing member and the moving portion.

8. The communication unit as claimed in claim 7, wherein the a moving member, connects the first spring, and the engaging member engages with the fixing member in a detachable manner.

9. The communication unit as claimed in claim 8, wherein the push portion comprises: a button, disposed on the housing, engaging with the engaging member in a detachable manner; and a second spring connecting the button and the housing.

10. The communication unit as claimed in claim 6, wherein the cover portion is provided with a first cover, a second cover, and a third cover, and the slide frame is formed on the first cover.

11. The communication unit as claimed in claim 6, wherein the communication unit is a mobile phone.

* * * * *